US006301310B1

(12) United States Patent
Jackson et al.

(10) Patent No.: US 6,301,310 B1
(45) Date of Patent: Oct. 9, 2001

(54) EFFICIENT IMPLEMENTATION FOR SYSTEMS USING CEOQPSK

(75) Inventors: Tom Jackson, Frederick; Dave Roos, Boyds, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/211,172

(22) Filed: Dec. 14, 1998

(51) Int. Cl.[7] .................................................. H04L 27/04
(52) U.S. Cl. ............................ 375/309; 375/305; 375/308
(58) Field of Search ..................................... 375/268, 269, 375/271, 273, 274, 279, 283, 295, 300, 305, 308, 309

(56) References Cited

U.S. PATENT DOCUMENTS

| | | |
|---|---|---|
| 3,644,831 | 2/1972 | Latker et al. . |
| 3,815,029 | 6/1974 | Wilson . |
| 4,313,205 | 1/1982 | Rhodes . |
| 4,324,001 | 4/1982 | Rhodes . |
| 4,338,579 | * 7/1982 | Rhodes ................................. 332/100 |
| 4,613,976 | * 9/1986 | Sewerinson et al. ................ 375/279 |
| 5,095,539 | 3/1992 | Leveque . |
| 5,208,829 | 5/1993 | Soleimani et al. . |
| 5,309,479 | 5/1994 | Cheah . |
| 5,467,373 | 11/1995 | Ketterling . |
| 5,610,940 | * 3/1997 | Durrant et al. ....................... 375/150 |
| 5,629,961 | * 5/1997 | Kawabata ............................. 375/308 |
| 5,633,893 | * 5/1997 | Lampe et al. ........................ 375/297 |
| 5,774,788 | 6/1998 | Hannah et al. . |
| 5,790,601 | 8/1998 | Corrigan, III et al. . |
| 5,812,604 | 9/1998 | Herbst et al. . |
| 5,815,531 | * 9/1998 | Dent ..................................... 375/298 |
| 6,091,789 | * 7/2000 | Weinholt ............................... 375/371 |

OTHER PUBLICATIONS

"Quarternary Transmission Over Satellite Channels With Cascaded Nonlinear Elemnets and Adjacent Channel Interference", Russell J. F. Fang, IEEE, vol. Com–29, No. 5, May 1981, pp. 567–581.

(List continued on next page.)

Primary Examiner—Stephen Chin
Assistant Examiner—Lenny Jiang
(74) Attorney, Agent, or Firm—John T. Whelan; Michael W. Sales

(57) ABSTRACT

Circuitry for modulating the frequency of a carrier signal with data signals for high frequency radio transmission, which includes a MSK generator for generating a series of in-phase (I) signals and an associated series of quadrature (Q) signals corresponding to the data signals to be transmitted. A first shift register receives binary input from the I signals generated with the MSK generator, the binary input being indicative of the sign orientation of the generated I signals from the MSK generator. A second shift register receives binary input from the Q signals generated with the MSK generator, with the binary input being indicative of the sign orientation of the generated Q signals from the MSK generator. A first finite impulse response (FIR) filter is provided for summing a series of delayed binary input received from the I signals at the first shift register to generate filtered I signals, and likewise a second FIR filter is provided for summing a series of delayed binary input received from the Q signals to generate filtered Q signals. A local oscillator (LO) generates the carrier signal, and an I/Q modulator is used for modulating the phase shift of the LO signal according to the filtered I signals and the filtered Q signals from the first and second FIR filters respectively.

19 Claims, 4 Drawing Sheets

OTHER PUBLICATIONS

"MSK and Offset QPSK Signal Transmissions Through Nonlinear Satellite Channels in the Presence of Intersymbol Interference", N. Ekanayake, IEEE Proceedings, vol. 130, Part F, No. 6, Oct. 1983, pp. 513–518.

"Effect of Nonlinear Amplifiers of Transmitters in the CDMA System Using Offset–QPSK", Manabu Sawada, et al, IEICE Trans. Commun., vol. E76–B, No. 7 Jul. 1993, pp. 741–744.

"Experimental Results on Constant Envelope Signaling With Reduced Spectral Sidelobes", Frank Amoroso, International Conference on Communications, Jun. 14–18, 1981, pp. 47.1.1–47.1.5.

"Modem design Using Continuous Phase Modulation With Coding", Carl Ryan, 1985 IEEE Military Communications Conference, Oct. 20–23, 1985, pp. 11.5.1–11.5.6.

"The Effects of Filtering and Limiting A Double–Binary PSK Signal", Robert K. Kwan, IEEE Transactions on Aerospace and Electronic Systems, vol. AES–5, No. 4, Jul. 1969, pp. 589–594.

"VSAT Networks", G. Maral, pp. 27–33.

* cited by examiner

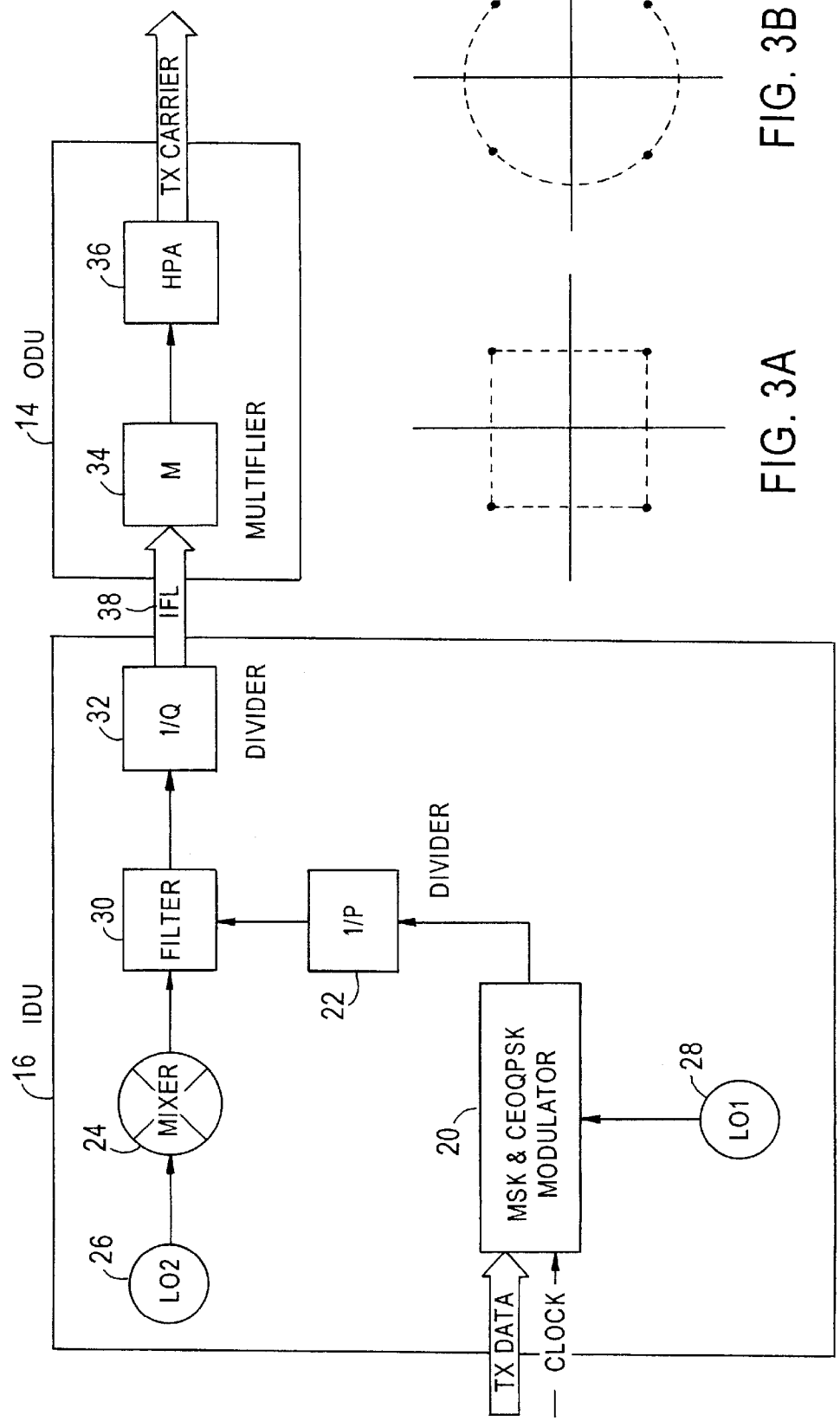

EFFICIENT IMPLEMENTATION FOR SYSTEMS USING CEOQPSK

BACKGROUND OF THE INVENTION

The present invention relates to cellular and satellite communications. More particularly, the invention relates to methods and apparatus for efficient implementation of communication systems using constant envelope offset quadrature shift key (CEOQPSK) and minimum shift key (MSK) modulated carriers in very small aperture terminal (VSAT) satellite applications with improved transmission carrier spectral efficiency.

Recently, VSAT earth stations which employ very small antennas and cost effective transponder circuitry have become increasingly acceptable with the general reduction in the overall cost for the VSAT earth station concept. The VSAT antenna ground terminals developed recently, referred to as remote ground terminals, have been developed for data transmission at low rates. In such systems, the remote ground terminals are utilized for communicating via a satellite from a remote location to a central hub station. The central hub station communicates with multiple remote ground terminals, and has a significantly larger antenna, as well as a significantly larger power output capability than any of the remote ground terminals.

VSAT remote terminals may be used to communicate data, voice, and video, to or from a remote site to a central hub. Typically, the VSAT remote terminals have a small aperture directional antenna for receiving from or transmitting signals to a satellite, via an outdoor unit (ODU) mounted near the antenna for transmitting a modulated carrier generated by an indoor unit (IDU). The IDU demodulates incoming signals received from the ODU and also operates as an interface between a user communication equipment and the ODU of the remote ground terminal.

The viability of the remote ground terminal concept increases as the cost for providing a remote ground terminal at the remote location decreases. In pursuit of this objective, various techniques have been utilized to reduce the cost of the remote ground terminal. For example, U.S. Pat. No. 5,208,829 describes a spread spectrum technique that maximizes the power output from a satellite so as to allow a cost saving reduction in the size of the antenna of the remote ground terminal. U.S. Pat. No. 5,309,479 describes a remote ground terminal comprising a low cost transmitter for producing a frequency shift key (FSK) modulated uplink signal which is utilized to communicate with the central hub station via the satellite. Cost effective IDU and ODU design concepts are described in U.S. Pat. No. 5,774,788 which discloses the remote ground terminal having an ODU with a frequency multiplier which allows for operation with a decreased noise component in the output signal transmitted to the satellite.

Previously VSAT remote terminal systems have used linear quadrature phase shift key (QPSK) modulated carriers, which require a linear mixing type ODU for frequency up conversion. The use of linear up converters to frequency convert the modulated data signal contributes to the generation of unwanted spurious signals due to the fact that linear up converters typically contain local oscillators (LOs) which operate in conjunction with mixers to perform the frequency multiplication. Additionally, such circuitry typically requires significant back off of the output high power amplifier (HPA) in order to maintain linearity to provide good carrier spectral efficiency. These systems are complex and expensive to produce, and such circuitry presents numerous drawbacks. Schemes using frequency shift key (FSK), minimum shift key (MSK), and gaussian minimum shift key (GMSK) modulated carriers are also used which are less complex, and lower in cost without the need for linear up conversion IDUs, however the penalty paid with schemes such as FSK, MSK, and GMSK is considerably reduced carrier spectral efficiency.

Accordingly, in order to reduce the cost and increase the efficiency of VSAT systems, there exists a need for remote ground terminals having an IDU utilizing a modulated carrier which has the advantages of the lower cost schemes while also producing carriers with low noise characteristics while providing good spectral efficiency comparable to linear QPSK. There also exists a need to minimize the number of circuitry components contained in the IDU and ODU system to provide VSAT transponder circuitry in a cost effective manner.

SUMMARY OF THE INVENTION

Accordingly, the present invention produces a constant envelope offset QPSK (CEOQPSK) modulated carrier with a saturated output multiplying type ODU for a VSAT remote terminal used in satellite communications. A reduced index CEOQPSK signal is generated by the IDU. The signal is provided to the multiplying ODU which restores the modulation to its full index signal, amplifies it using a saturated HPA, and provides the full index signal to the VSAT antenna for transmission to the satellite. The CEOQPSK signal from the IDU is generated using a modified MSK modulator. The system therefore may operate with either a CEOQPSK or a MSK modulated carrier. Thus, the CEOQPSK modulated carrier provides the advantages of lower cost schemes while producing modulated carriers having low noise and superior spectral efficiency, which when compared with prior existing schemes, is more spectrally efficient and lower in cost with comparable functionality.

Briefly summarized, the present invention relates to methods and apparatus for modulating the frequency of a carrier signal with data signals for high frequency radio and microwave transmissions. Circuitry is provided which includes a MSK generator for generating a series of in-phase (I) signals and an associated series of quadrature (Q) signals corresponding to the data signals to be transmitted. A first shift register receives binary input from the I signals generated with the MSK generator, the binary input being indicative of the sign orientation of the generated I signals from the MSK generator. A second shift register receives binary input from the Q signals generated with the MSK generator, with the binary input being indicative of the sign orientation of the generated Q signals from the MSK generator.

The constellation of the CEOQPSK modulation signals are thus generated from a modified MSK generator. A first finite impulse response (FIR) filter is provided for summing a series of delayed binary input received from the I signals at the first shift register to generate filtered I signals. Likewise, a second FIR filter is provided for summing a series of delayed binary input received from the Q signals to generate filtered Q signals. A local oscillator (LO) generates the carrier signal, and an I/Q modulator is used for modulating the phase shift of the LO signal according to the filtered I signals and the filtered Q signals from the first and second FIR filters respectively.

It will be understood that both the foregoing and general description in the following detailed description are exemplary and intended to provide further explanation of the invention as claimed. The accompanying drawings provide an understanding of the invention as described in the preferred embodiments to illustrate the invention and to serve to explain the principles of the invention.

BRIEF DESCRIPTION OF THE DRAWINGS

FIG. 2 is a block diagram illustrating the preferred embodiment of the indoor unit (IDU) for use with the outdoor unit (ODU) having a frequency multiplier in accordance with the present invention;

FIGS. 3A and 3B illustrate constellation scatter diagrams for linear offset QPSK and CEOQPSK modulation, respectively, as provided in the MSK and CEOQPSK modulator of FIG. 2;

DETAILED DESCRIPTION OF THE PREFERRED EMBODIMENT

Figure 1:
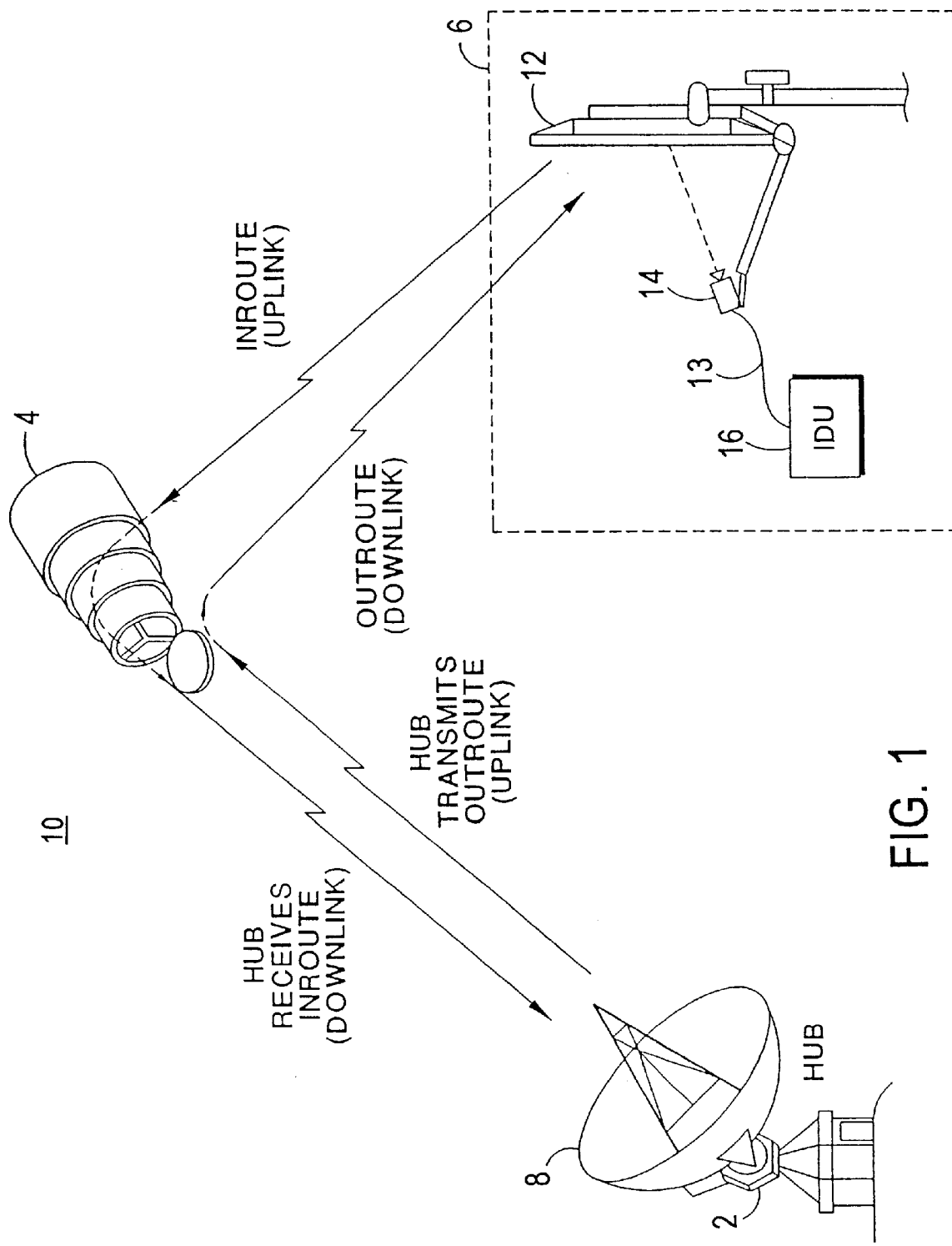
FIG. 1 is a block diagram of a very small aperture terminal (VSAT) satellite communication network which utilizes the present invention.

With reference to the drawings, and particularly FIGS. 1 and 2, an embodiment implementing modulated data carriers in a very small aperture terminal (VSAT) satellite application with improved transmission carrier spectral efficiency is shown in a VSAT satellite communication network 10 which includes a central hub station 2, a communication satellite 4, and a plurality of ground terminals, e.g., ground terminal 6. The VSAT network 10 functions as a two-way transmission system for transferring data and voice communications between the central hub station 2 and numerous remote ground terminals 6 (one shown). All data is transferred between the central hub station 2 and the remote ground terminal 6 via transponders located in the satellite 4. Signals transmitted from the central hub station 2 to one of the remote ground terminals 6 are referred to as outroute, while signals transmitted in the opposite direction are referred to as inroute signals.

The central hub station 2 shown in FIG. 1 may support a plurality of remote ground terminals 6. The central hub station 2 includes a large antenna 8 so as to allow for the transmission of a signal sufficiently strong such that the signal can be received by the remote ground terminal 6 which have relatively small VSAT antennas. The large antenna 8 of the central hub station 2 also compensates for the relatively weak signals transmitted by the remote ground terminal 6.

The communication satellite 4 functions as a microwave relay which receives signals from both the central hub station 2 and the remote ground terminals 6. The satellite 4 includes a transponder which receives, amplifies, and retransmits each signal within a predefined channel bandwidth. The transponders of the VSAT network 10 may operate at various frequencies, e.g., Ku and C bands, which provide separate frequencies for reception and retransmission of the inroute and outroute signals.

Each remote ground terminal 6 includes a VSAT antenna 12 for receiving, i.e., downlink signals, and for transmitting, i.e., uplink signals, via an outdoor unit (ODU) 14 typically mounted proximate to the VSAT antenna 12. The ODU 14 includes a transmitter module for amplifying and frequency multiplying a modulated data signal, e.g., MSK, modified MSK, CEOQPSK, and the like, as discussed herein. The modulated data signal is thus coupled to the VSAT antenna 12 and an indoor unit (IDU) 16 which operates as an interface between the user communication equipment and the ODU 14. The IDU 16 also generates the modulated data signal which is amplified and frequency multiplied by the transmitter module of the ODU 14. The transmitter module may be provided with an input buffer amplifier followed by a frequency multiplier, filter, and a saturated power amplifier. Control circuitry is further provided allowing the ODU 14 to operate in several modes including a burst mode/Time Division Multiple Access (TDMA), Code Division Multiple Access (CDMA) modes and the like.

Figure 5:
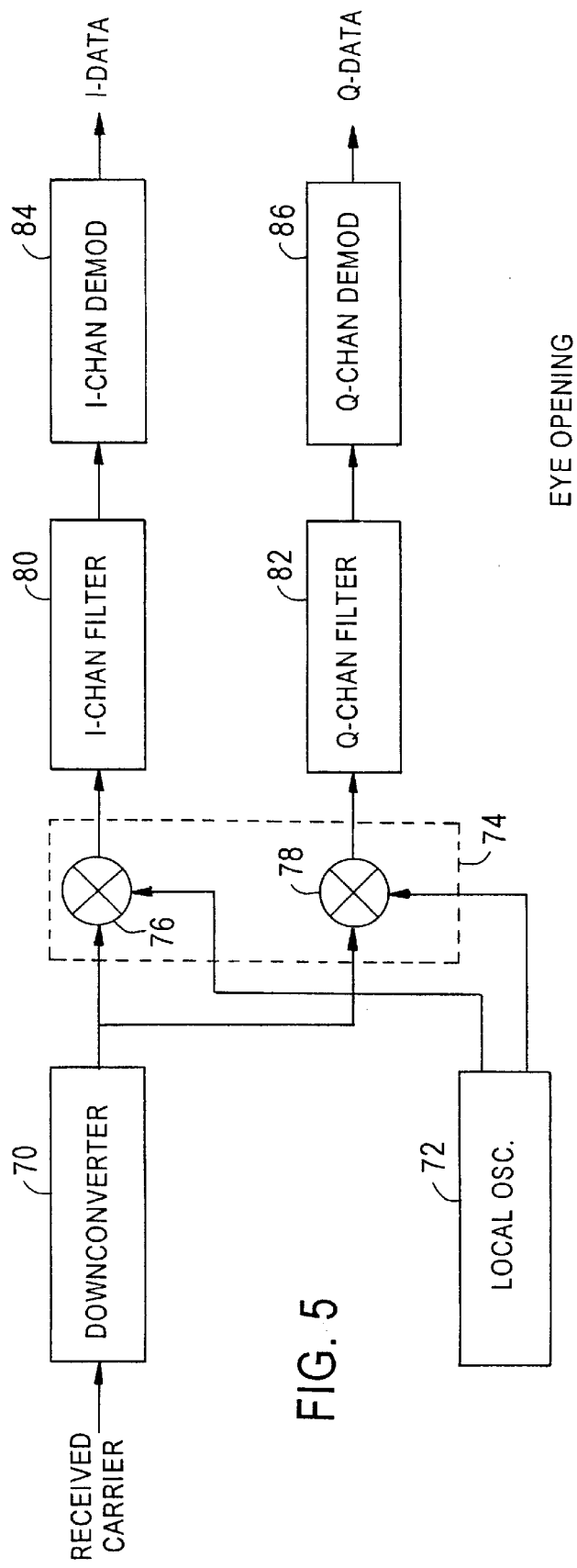
FIG. 5 is a block diagram of a receiver utilized in a VSAT hub.

During normal operation, the IDU 16 receives data from the user equipment and modulates a reference signal in accordance with the data to be transmitted such that the modulated data signal is produced. FIG. 2 shows a block diagram illustrating an embodiment of the IDU 16 for use with the ODU 14 which includes a frequency multiplier. As explained below, the modulation scheme utilized in the described embodiments are such that the modulated data signal includes modified MSK and/or switchable MSK and CEOQPSK modulated data signals. The modulated data signal is then transferred to the ODU 14. The transmitter module of the ODU 14 functions to amplify and frequency multiply the modulated data signal so as to produce a modulated carrier signal. The modulated carrier signal is then coupled to the VSAT antenna 12 via a waveguide and feed horn, and then transmitted to the satellite 14. Upon receipt by the central hub station 2, the modulated carrier signal is demodulated (with a receiver as shown in FIG. 5) such that the data transmitted from the remote user is reproduced and processed by the central hub station 2. The IDU 16 also supplies the ODU 14 with power and control signals as well as a low noise modulated carrier, which signals are multiplexed with the modulated data signal and transferred to the ODU 14 as a single signal via an Interfacility Link (IFL) 13 which may be provided as a single cable.

As shown in FIG. 2, the remote ground terminal IDU 16 generates a modulated data signal coupled via IFL 38 to the ODU 14 which transmits a modulated carrier to the satellite 4. In the IDU 16, serial data to be transmitted is applied to an MSK and CEOQPSK modulator 20 and mixed with a local oscillator, LO1 28. The modulated carrier is divided by a factor P using a divider 22. The carrier signal is then mixed with a second local oscillator, LO2 26, using a mixer 24 to produce a frequency translated lower modulation index carrier. The frequency translated carrier is then selected by a filter 30 and divided by a factor Q using a divider 32 to produce an even lower index modulation carrier which provides a low noise modulated carrier for transmission to the ODU 14 via the IFL 38. In the described embodiment, a multiplication factor, discussed further below, M, is equal to the product of the Q and P factors of the IDU 16.

The resultant lower index modulation carrier from the IDU 16, provided to the ODU 14 via the IFL 38, undergoes frequency multiplication in the ODU 14 with a multiplier 34 where M=Q*P which restores full scale index modulation once again. In the described embodiment, the multiplier M is typically 128, with the Q*P product being provided as P being 16 and Q being approximately 8. Thus, with a one GHz local oscillator signal from LO1 28 and a frequency offset of approximately 800 MHz provided via LO2 26, the one GHz modulation appears on a 14 GHz output signal by using the frequency offset, which facilitates a quiet low noise IFL signal from the IDU 16 prior to multiplication in the ODU 14. The full index modulated carrier is then amplified by high power amplifier (HPA) 36 and provided as a transmission carrier to the system antenna for transmission to the satellite via the VSAT antenna 12.

FIGS. 3A and 3B illustrate constellation scatter diagrams for a linear offset QPSK and CEOQPSK modulation, respectively, as provided in the MSK and CEOQPSK modulator 20. As illustrated in the IDU 16 shown in FIG. 2, it is desired that the carrier generated be divided, mixed, multiplied, and amplified without distortion of the carrier signal. Whereas the linear QPSK signal of FIG. 3A provides a square scatter diagram, upon division and subsequent multiplication, it is observed that a circular scatter diagram results with the loss of amplitude information. Thus, it is desired to provide the CEOQPSK signal with amplitude information removed, resulting in a scatter diagram as shown in FIG. 3B in the form of a circle which is not affected by the operations performed in the IDU 16 and ODU 14. Additionally, by starting with a circular scatter diagram, if α is equal to unity, it is further observed that the bandwidth does not grow with subsequent operation of the modulated carrier signal, thus providing a spectrally efficient carrier.

Figure 4:
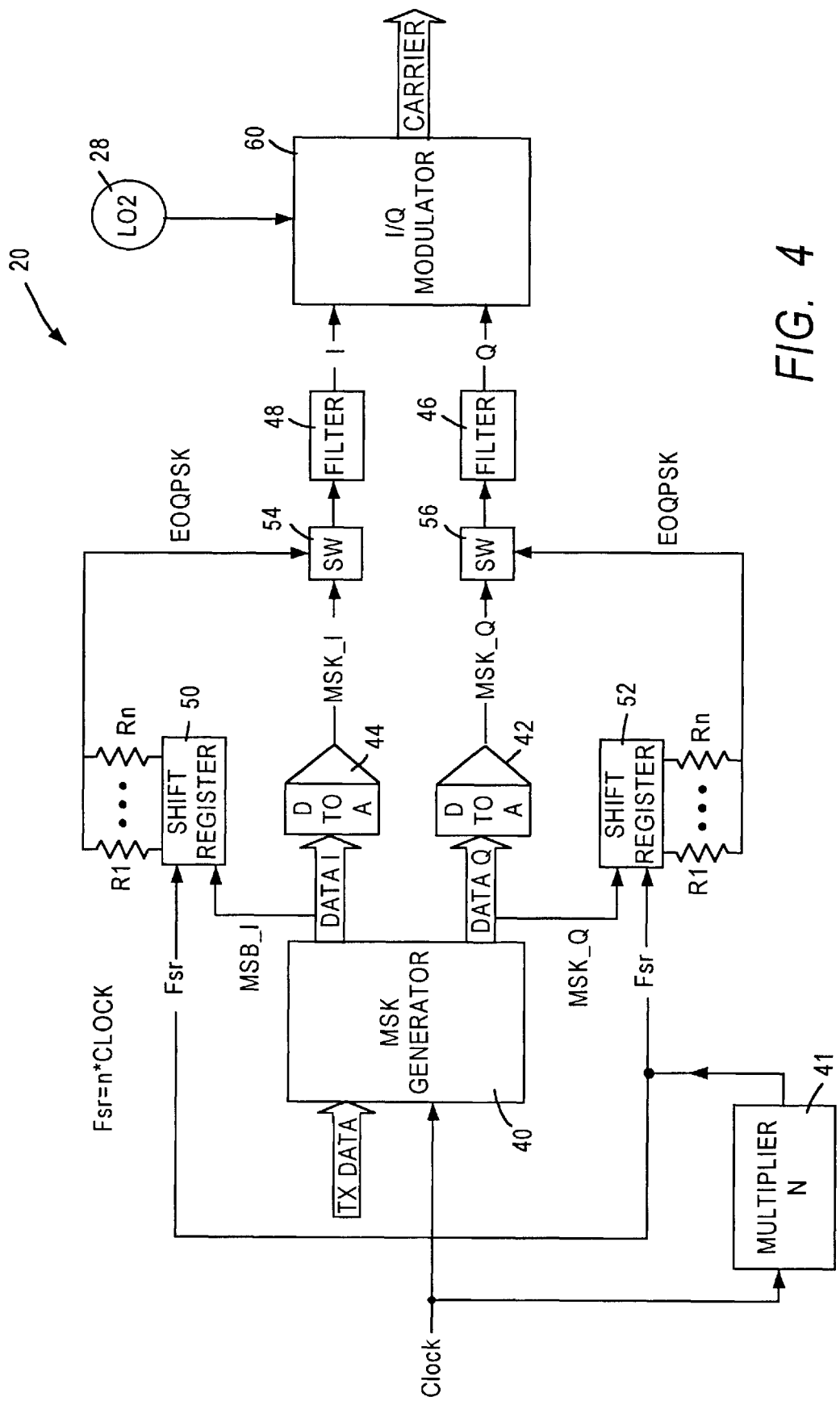
FIG. 4 is a block diagram illustrating the MSK and CEOQPSK modulator circuitry of the preferred embodiment of the transmitter module of FIG. 2.

FIG. 4 shows a novel eloquent implementation of the MSK and CEOQPSK modulator 20, with a modified MSK modulator embodiment allowing for the switching between MSK and CEOQPSK modulation in the IDU 16. The IDU serial data to be transmitted is applied to a standard digital MSK generator 40 which performs in-phase (I) and quadrature (Q) MSK digital data. The I and Q data produced by the conventional MSK generator drives digital to analog converters (DACs) 42 and 44 to produce I and Q analog MSK data. Alternately, the most significant bits (MSBS) of the I MSK digital data is provided to a shift register 50 and the Q MSK digital data is provided to a second shift register 52.

When twos complement or sign plus binary digital data is provided from the MSK generator, the first shift register receives a binary input from the I signals generated with the MSK generator, wherein the binary input is indicative of the sign orientation of the generated I signals from the MSK generator to slice the amplitude sign information, and thus remove amplitude information from the data generated from the MSK generator. Similarly, the second shift register 52 receives binary input from the Q signals generated with the MSK generator, the binary input also being indicative of the sign orientation of the generated Q signals from the MSK generator. Each shift register is clocked by a multiplied clock signal, Fsr, which is a multiple of and synchronous to the digital data $TX_{13}$ clock. Multiplied clock signal Fsr is generated by multiplier 41. In the described embodiment, the first and second shift registers may include, e.g., CMOS 8-bit serial registers, in which case the Fsr clock is multiplied by a factor of eight (8). The outputs of the shift registers 50 and 52 are summed together using series resistors to produce CEOQPSK I and CEOQPSK Q analog signals. The resistor values are weighted to give the appropriate analog finite impulse response (FIR) base band filtering. Switches 54 and 56 select either MSK or CEOQPSK modes, the switch signal providing a modified MSK modulated signal for coupling via anti-aliasing filters 46 and 48 respectively to an I/Q modulator 60 for generating the modulated data carrier from the MSK and CEOQPSK modulator 20.

With reference again to FIG. 2, the waveform resulting from the division of the modulated carrier via the divider 22 has constant envelope, but some distortion may result due to the fact that the input to the divider may not be perfectly constant envelope, and typically the divider 22 may further provide a slicing operation with a slicer for removing amplitude information from the signal. This distortion can be viewed as cross-coupling of the I channel into the Q channel and vice versa. The operations of the dividers 22 and 32, and the subsequent multiplier 34 in FIG. 2, should not introduce additional distortion.

FIG. 5 shows a typical receiver architecture in the form of a block diagram of a receiver using a VSAT hub. The modulators discussed above should not introduce non-linear effects, allowing each channel to be orthogonal and hence non-interfering with respect to each other. In conventional receivers, the receive carrier which will be on the order of 12 GHz will be down converted by down converter 70 and demodulated using a local oscillator 72 with an I/Q demodulator 74 having mixers 76 and 78 to demodulate the I channel and the Q channel respectively. The I channel and Q channel signal outputs from the I/Q demodulator 72 are each filtered with respective I channel filter 80 and Q channel filter 82, which are provided as Finite Impulse Response (FIR) filters.

Figure 6:
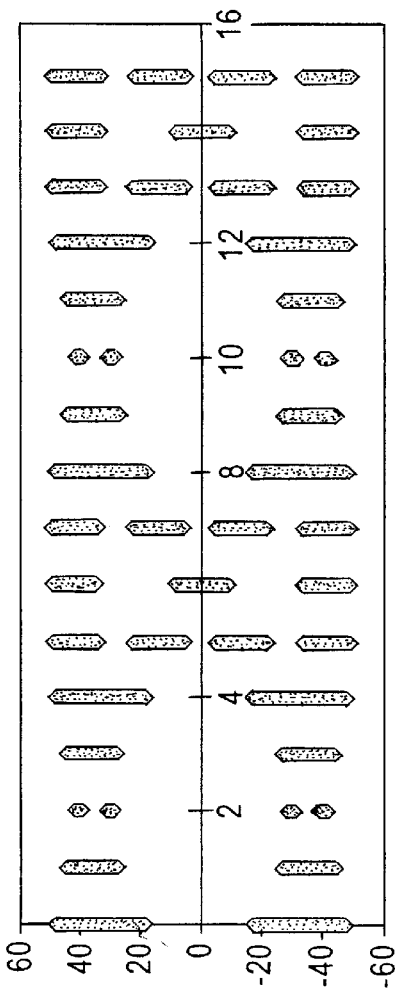
FIG. 6 illustrates a base band "eye" diagram identifying signal delay for minimizing Inner Symbol Interference (ISI).

The filters 80 and 82 provide base band filtering in order to maximize the Signal to Noise Ratio (SNR), while at the same time minimizing the Inter-Symbol Interference (ISI) of each individual channel. Nonetheless, in the described embodiment, the non-linear effects do cause some cross talk between the two channels. Accordingly, each receive filter 80,82 is therefore optimized to maximize the SNR and ISI ratios, but the ISI as defined herein is the peak-to-peak interference. The desired FIR filter taps, herein 52 taps, was optimized using a computer program, herein an Excel spreadsheet, although any conventional program such as Mathlab or the like may be used to optimize the filter coefficients of filters 80,82. As shown in FIG. 6, the base band "eye" diagram illustrates the minimization of the ISI by identifying the signal delay, herein shown at a delay of two (2) which is repeated at ten (10) for the 8-bit shift register embodiment discussed herein.

The resulting optimization results in a base band "eye" diagram similar to that of FIG. 6. It will be noted that at X-axis values of two and ten, the "eye" opening has converged to four distinct points. Each pair of points (innermost and outermost pairs) correspond to events occurring on the opposite orthogonal channel. In particular, the eye opens to the outermost points when the opposite channel is changing from zero to one or changing from one to zero in transition, and the innermost points when the opposite channel is unchanged. Thus, it is possible to correct the cross talk to a first order by examining the previous and present signals on the opposite channel, which may be mathematically modeled as in the described embodiment. In particular, the opposite channel is hard-decisioned demodulated and the exclusive-OR taken of the previous bit with the present bit. If the result is "1", the eye channel data is scaled downwards by half the difference between the two top points in FIG. 6. If the result is "the numeral 0", the eye channel data is then scaled upwards by the same amount. The result is the most nearly optimal signal level against which to establish the decision thresholds for the binary channel data.

It should be appreciated that a wide range of changes and modifications may be made to the preferred embodiments for efficient implementation for systems using CEOQPSK as described herein. Thus, it is intended that the foregoing detailed description be regarded as illustrative rather than limiting, and that the following claims, including all equivalents, are intended to define the scope of the invention.

What is claimed is:

1. A circuit for modulating the frequency of a carrier signal for data transmission, comprising:
   a minimum shift key (MSK) generator for generating a series of in-phase (I) signals and an associated series of quadrature (Q) signals corresponding to the data signals to be transmitted;
   a first shift register for receiving binary input from the I signals generated with the MSK generator, said binary input being indicative of the sign orientation of the generated I signals from the MSK generator, said first shift register comprising a single bit shift register for receiving the most significant bit of digital data of said I signals;
   a second shift register for receiving binary input from the Q signals generated with the MSK generator, said binary input being indicative of the sign orientation of the generated Q signals from the MSK generator, said second shift register comprising a single bit shift register for receiving the most significant bit of digital data of said Q signals;
   a first finite impulse response (FIR) filter for summing a series of delayed binary input received from the I signals at said first shift register to generate filtered I signals;
   a second FIR filter for summing a series of delayed binary input received from the Q signals at said second shift register to generate filtered Q signals;
   a local oscillator (LO) for generating a carrier signal; and
   an I/Q modulator for modulating the phase shift of the LO signal according to the filtered I signals and the filtered Q signals from said first FIR filter and said second FIR filter respectively.

2. A circuit as recited in claim 1 wherein said MSK generator generates said I signals and said Q signals as digital data.

3. A circuit as recited in claim 2 comprising digital to analog converters (DACs) for coupling each of the digital data from the respective I signals and Q signals from the MSK generator to the I/Q modulator for modulating the LO signal for MSK modulation.

4. A circuit as recited in claim 3 comprising an I signal switch and a Q signal switch for switching between respective I and Q FIR filter and DAC signals providing switching between offset quadrature phase shift key OQPSK and MSK modulation of the LO signal at the I/Q modulator.

5. A circuit as recited in claim 1 wherein said most significant bit comprises the sign bit of said digital data from said MSK generator.

6. A circuit as recited in claim 1 wherein said first FIR filter and said second FIR filter comprise resistors for coupling the series of delayed binary data at a summing node for generating said filtered I signals and said filtered Q signals respectively.

7. A circuit as recited in claim 6 comprising anti-aliasing filters between said first FIR filter and said second FIR filter and the I/Q modulator.

8. A remote ground terminal indoor unit (IDU) for generating a modulated data signal coupled via an interfacility link (IFL) to an outdoor unit (ODU) which transmits a modulated carrier to a satellite, said IDU apparatus comprising:
   a minimum shift key (MSK) generator for receiving a transmit and clock signals;
   a frequency multiplier for multiplying the clock signal;
   a digital filter for receiving data from said MSK generator, said digital filter being operated according to a multi-plied clock rate generated by said clock multiplier responsive to the clock signal;
   a digital to analog converter for receiving data from said MSK generator;
   a switch for switching between said digital filter and said digital to analog converter;
   a modulator for receiving a signal via said switch, the switched signal providing a modified MSK modulated signal for coupling via the IFL to the ODU; and
   said digital filter removing magnitude information from said MSK generated data to provide offset quadrature phase shift key OQPSK signals via said switch.

9. An apparatus as recited in claim 8 wherein said digital filter comprises a shift register having resistor-weighted outputs providing a finite impulse response (FIR) output to said switch as the OQPSK signal.

10. An apparatus as recited in claim 8 comprising a second digital filter, first and second digital filters generating in-phase (I) and quadrature (Q) signals, and a second digital to analog converter for respective I and Q MSK signals, said switch further comprising I and Q switches allowing switching of the modified MSK modulator between MSK and OQPSK modulated data signals coupled via the IFL to the ODU.

11. A method of modulating the frequency of a carrier for data transmission, comprising the steps of:
   minimum shift keying for generating a series of in-phase (I) signals and an associated series of quadrature (Q) signals corresponding to minimum shift key (MSK) data signals to be transmitted;
   digital to analog converting the I and Q signals for MSK modulation; and
   digital filtering the I and Q signals for offset quadrature phase shift key OQPSK modulation; and
   switching between the MSK and OQPSK modulation for generating modulated data signals.

12. A modulation method as recited in claim 11 wherein said digital filtering step comprises delaying a series of the I and Q signals and summing a weighted average of each of the delayed series of I and Q signals to generate OQPSK modulating signals.

13. A modulation method as recited in claim 11 wherein said digital filtering step comprises finite impulse response (FIR) filtering a series of the I and Q signals to generate OQPSK modulating signals.

14. A modulation method as recited in claim 11 comprising removing amplitude information from the I and Q signals to generate OQPSK modulating signals.

15. An apparatus for generating CEOQPSK signals, comprising:
   a signal generator for generating two streams of binary data offset in time by half symbol;
   a filter coupled to said signal generator for analog filtering said binary streams to produce an approximation to an OQPSK signal, said filter comprising a first single bit shift register utilized for generating an I signal associated with said OQPSK signal, and a second single bit shift register utilized for generating a Q signal associated with said OQPSK signal;
   a modulator for slicing said approximation to eliminate the residual amplitude modulation from the OQPSK signal; and
   output circuitry for translating the carrier frequency and amplifying said sliced signal to produce the CEOQPSK signal at the desired final frequency and power, wherein said first single bit shift register receives the most significant bit of digital data of said I signal, and said second single bit shift register receives the most significant bit of digital data of said Q signals.

16. An apparatus as recited in claim 15, wherein said output circuitry comprises a divider for dividing said sliced signal down to a lower frequency, translating said divided signal, and multiplying said signal up to the final frequency, and amplifying it to the desired final power.

17. An apparatus as recited in claim 15, wherein said modulator modulates the carrier frequency with said data to produce a reduced-modulation index OQPSK signal, and said output circuitry comprises a multiplier for frequency multiplying said reduced-modulation index OQPSK signal to the desired final frequency and full-indexed signal.

18. A circuit for modulating the frequency of a carrier signal for data transmission, comprising:

a minimum shift key (MSK) generator for generating a series of in-phase (I) signals and an associated series of quadrature (Q) signals corresponding to the data signals to be transmitted;

a first shift register for receiving binary input from the I signals generated with the MSK generator, said binary input being indicative of the sign orientation of the generated I signals from the MSK generator;

a second shift register for receiving binary input from the Q signals generated with the MSK generator, said binary input being indicative of the sign orientation of the generated Q signals from the MSK generator;

a first finite impulse response (FIR) filter for summing a series of delayed binary input received from the I signals at said first shift register to generate filtered I signals;

a second FIR filter for summing a series of delayed binary input received from the Q signals at said second shift register to generate filtered Q signals;

a local oscillator (LO) for generating a carrier signal; and an I/Q modulator for modulating the phase shift of the LO signal according to the filtered I signals and the filtered Q signals from said first FIR filter and said second FIR filter respectively, wherein said MSK generator generates said I signals and said Q signals as digital data, and said binary input received at said first shift register and said second shift register respectively comprise the most significant bit from the digital data generated from the respective I signals and Q signals with the MSK generator.

19. A circuit for modulating the frequency of a carrier signal for data transmission, comprising:

a minimum shift key (MSK) generator for generating a series of in-phase (I) signals and an associated series of quadrature (Q) signals corresponding to the data signals to be transmitted;

a first shift register for receiving binary input from the I signals generated with the MSK generator, said binary input being indicative of the sign orientation of the generated I signals from the MSK generator;

a second shift register for receiving binary input from the Q signals generated with the MSK generator, said binary input being indicative of the sign orientation of the generated Q signals from the MSK generator;

a first finite impulse response (FIR) filter for summing a series of delayed binary input received from the I signals at said first shift register to generate filtered I signals;

a second FIR filter for summing a series of delayed binary input received from the Q signals at said second shift register to generate filtered Q signals;

a local oscillator (LO) for generating a carrier signal; and an I/Q modulator for modulating the phase shift of the LO signal according to the filtered I signals and the filtered Q signals from said first FIR filter and said second FIR filter respectively, wherein said first FIR filter and said second FIR filter comprise resistors for coupling the series of delayed binary data at a summing node for generating said filtered I signals and said filtered Q signals respectively.

* * * * *